(12) United States Patent
Liu et al.

(10) Patent No.: US 11,536,957 B2
(45) Date of Patent: Dec. 27, 2022

(54) METHOD AND APPARATUS FOR OPTIMIZING A LENS OF A VIRTUAL REALITY DEVICE, AND COMPUTER READABLE STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yali Liu, Beijing (CN); Chenru Wang, Beijing (CN); Ruijun Dong, Beijing (CN); Xuebing Zhang, Beijing (CN); Ke Li, Beijing (CN); Hao Zhang, Beijing (CN); Lili Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 607 days.

(21) Appl. No.: 16/474,791

(22) PCT Filed: Dec. 21, 2018

(86) PCT No.: PCT/CN2018/122543
§ 371 (c)(1),
(2) Date: Jun. 28, 2019

(87) PCT Pub. No.: WO2019/161699
PCT Pub. Date: Aug. 29, 2019

(65) Prior Publication Data
US 2021/0405354 A1 Dec. 30, 2021

(30) Foreign Application Priority Data
Feb. 24, 2018 (CN) .......................... 201810156860.2

(51) Int. Cl.
*G02B 27/00* (2006.01)
*G02B 27/01* (2006.01)

(52) U.S. Cl.
CPC ..... *G02B 27/0012* (2013.01); *G02B 27/0172* (2013.01); *G02B 2027/011* (2013.01)

(58) Field of Classification Search
CPC ............ G02B 27/0012; G02B 27/0172; G02B 27/0025; G02B 27/005; G02B 27/0056;
(Continued)

(56) References Cited

U.S. PATENT DOCUMENTS

2009/0002574 A1* 1/2009 Sorek .................. H04N 5/3572
348/784
2016/0370578 A1* 12/2016 Guenter ............. G02B 27/0012
(Continued)

FOREIGN PATENT DOCUMENTS

CN 1844967 A 10/2006
CN 104049369 A 9/2014
(Continued)

OTHER PUBLICATIONS

Zemax Manual (Year: 2006).*
(Continued)

*Primary Examiner* — Travis S Fissel
(74) *Attorney, Agent, or Firm* — Calfee, Halter & Griswold LLP

(57) ABSTRACT

A method and apparatus for optimizing a lens of a virtual reality device and a computer readable storage medium. The method for optimizing a lens of a virtual reality device includes setting an optimization objective and optimization variables for imaging with a lens; and performing optimization processing on the imaging of an object point through the lens by the optimization variables, and obtaining a lens parameter value by which the imaging result is in accordance with the optimization objective, an image surface of the imaging of the object point through the lens being an image surface on which the astigmatism is less than a preset threshold.

11 Claims, 10 Drawing Sheets

(58) Field of Classification Search
CPC .......................... G02B 27/0062; G02B 27/01; G02B 27/0101; G02B 27/017; G02B 2027/011
USPC ...... 359/13–14, 462–477, 629–633 and, 642
See application file for complete search history.

(56) References Cited

U.S. PATENT DOCUMENTS

2017/0343819 A1* 11/2017 Lerner ............... G02B 27/0172
2018/0003862 A1* 1/2018 Benitez ............... H04N 13/344

FOREIGN PATENT DOCUMENTS

| CN | 106324838 A | 1/2017 |
| CN | 106405841 A | 2/2017 |
| CN | 106842558 A | 6/2017 |
| CN | 107561694 A | 1/2018 |
| CN | 108333748 A | 7/2018 |

OTHER PUBLICATIONS

Second Office Action for Chinese Patent Application No. 201810156860.2 dated Dec. 16, 2019.
Search Report and Written Opinion for International Application No. PCT/CN2018/122543 dated Mar. 22, 2019.
First Office Action for Chinese Patent Application No. 201810156860.2 dated Jun. 5, 2019.

* cited by examiner

METHOD AND APPARATUS FOR OPTIMIZING A LENS OF A VIRTUAL REALITY DEVICE, AND COMPUTER READABLE STORAGE MEDIUM

CROSS REFERENCE TO RELATED APPLICATIONS

This application is the U.S. national phase entry of PCT International Application No. PCT/CN2018/122543, filed on Dec. 21, 2018, which claims the benefit of Chinese Patent Application No. 201810156860.2, filed on Feb. 24, 2018, the entire contents of which are incorporated herein by reference.

TECHNICAL FIELD

The application relates to, but not limited to, the field of optical lens technology and in particular, to a method and apparatus for optimizing a lens of a virtual reality device and a computer readable storage medium.

BACKGROUND

With the continuous development of computer technology, virtual reality (VR for short) devices have become an important tool for people's entertainment life. The form and imaging effect of a lens in a VR device becomes one of main factors affecting the display effect of the VR device.

Lenses generally used in a related VR device include: three-piece, two-piece and one-piece lenses. Unfortunately, three-piece combined lenses are high in cost and are difficult to apply in practice because the weight and volume must be taken into account when it is worn on a human face in a practical application; although the weight and volume of a two-piece lens is improved as compared to the three-piece lens, the lens form is relatively special, processing and shaping the lens is difficult and the difficulty of assembly is increased. The one-piece lens is a mainstream design in current commercial applications, which may give consideration to advantages of low weight, small volume, low cost, etc. simultaneously. An objective of the design of a lens is to reduce an aberration in imaging as much as possible. The one-piece lens of the related VR device for example employs the design scheme of Fresnel lens. These lenses generally produce a low image quality and thus do not generally meet the needs of a user.

Thus, for lenses used in VR devices, a lens having high image quality, portability, yet low in cost is desired.

SUMMARY

An exemplary embodiment provides a method for optimizing a lens of a virtual reality device including: setting an optimization objective and optimization variables for imaging with a lens; performing optimization processing on the imaging of an object point through the lens by the optimization variables, and obtaining a lens parameter value by which the imaging result is in accordance with the optimization objective, an image surface of the imaging of the object point through the lens being an image surface when the astigmatism is zero.

In an exemplary embodiment, before the setting an optimization objective and optimization variables for imaging with a lens, the method further includes determining multiple fields of view corresponding to an object point to be imaged, and the performing optimization processing on the imaging of an object point through the lens by the optimization variables includes performing optimization processing on the imaging of an object point in each of the fields of view through the lens by the optimization variables.

In an exemplary embodiment, the performing optimization processing on the imaging of an object point through the lens by the optimization variables includes: generating an objective function according to the optimization objective and the optimization variables; determining initial values of the optimization variables; obtaining an imaging result of the object point through the lens according to the initial values of the optimization variables and the objective function; and adjusting the initial values of the optimization variables according to the comparison of the imaging result with the optimization objective, and obtaining the imaging result of the object point through the lens according to the adjusted initial values of the optimization variables and the objective function, until a lens parameter value is obtained by which the imaging result is accordance with the optimization objective.

In an exemplary embodiment, the optimization objective includes: a light spot of the imaging of the object point through the lens on the image surface meeting a first preset condition; and an aberration of the imaging of the object point through the lens meeting a second preset condition.

In an exemplary embodiment, the light of the object point includes red light, green light and blue light; and a light spot of the imaging of the object point through the lens on the image surface meeting a first preset condition includes one or more of the following: the root-mean-square radius of the red light spot, the green light spot and the blue light spot of the imaging of the object point on the image surface being less than a first radius value; and the geometric radius of the red light spot, the green light spot and the blue light spot of the imaging of the object point on the image surface being less than a second radius value.

In an exemplary embodiment, the aberration includes field curvature, astigmatism, distortion, dispersion, spherical aberration and coma, and an aberration of the imaging of the object point through the lens meeting a second preset condition includes one or more of the following: the positions of the meridional field curvature and the sagittal field curvature of the imaging of the object point being close to each other, such that the astigmatism is less than a preset threshold; the distortion and dispersion of the imaging of the object point being less than a preset threshold within a preset field of vision; and the spherical aberration and the coma of the imaging of the object point on the image surface being less than a preset threshold.

In an exemplary embodiment, the aberration includes field curvature, astigmatism, distortion, dispersion, spherical aberration and coma, and an aberration of the imaging of the object point through the lens meeting a second preset condition includes a weighted value of the field curvature, astigmatism, distortion, dispersion, spherical aberration and coma of the imaging of the object point through the lens being less than a preset aberration threshold.

In an exemplary embodiment, the optimization variables and the lens parameter include surface patterns of the two surfaces of the lens, the curvature radius and physical radius of each of the surfaces, and the thickness of the lens, and the optimization variables further include the surface pattern, curvature radius, physical radius and conic coefficient of the image surface.

An exemplary embodiment further provides an apparatus for optimizing a lens of a virtual reality device including: a setter for setting an optimization objective and optimization variables for imaging with a lens; and an optimization processor for performing optimization processing on the imaging of an object point through the lens by the optimization variables, and obtaining a lens parameter value by which the imaging result is in accordance with the optimization objective, an image surface of the imaging of the object point through the lens being an image surface on which the astigmatism is less than a preset threshold.

In an exemplary embodiment, there is further included a determinator for determining multiple fields of view corresponding to an object point to be imaged, and the optimization processor performing optimization processing on the imaging of an object point through the lens by the optimization of variables includes performing optimization processing on the imaging of an object point in each of the fields of view through the lens by the optimization variables.

In an exemplary embodiment, in the apparatus as described above, the optimization processor includes: a function generation unit for generating an objective function according to the optimization objective and the optimization variables; an initial value determination unit for determining initial values of the optimization variables; a result obtaining unit for obtaining an imaging result of the object point through the lens according to the initial values of the optimization variables and the objective function; and an optimization processing unit for adjusting the initial values of the optimization variables according to the comparison of the imaging result with the optimization objective, and obtaining the imaging result of the object point through the lens according to the adjusted initial values of the optimization variables and the objective function, until a lens parameter value is obtained by which the imaging result is accordance with the optimization objective.

In an exemplary embodiment, the optimization objective includes: a light spot of the imaging of the object point through the lens on the image surface meeting a first preset condition; and an aberration of the imaging of the object point through the lens meeting a second preset condition.

In an exemplary embodiment, the light of the object point includes red light, green light and blue light; and the size of the light spot of the imaging of the object point through the lens on the image surface being less than a preset threshold includes one or more of the following: the root-mean-square radius of the red light spot, the green light spot and the blue light spot of the imaging of the object point on the image surface being less than a first radius value; and the geometric radius of the red light spot, the green light spot and the blue light spot of the imaging of the object point on the image surface being less than a second radius value.

In an exemplary embodiment, the aberration includes field curvature, astigmatism, distortion, dispersion, spherical aberration and coma, and an aberration of the imaging of the object point through the lens meeting a second preset condition includes one or more of the following: the positions of the meridional field curvature and the sagittal field curvature of the imaging of the object point being close to each other, such that the astigmatism is less than a preset threshold; the distortion and dispersion of the imaging of the object point being less than a preset threshold within a preset field of vision; and the spherical aberration and the coma of the imaging of the object point on the image surface being less than a preset threshold; or an aberration of the imaging of the object point through the lens meeting a second preset condition includes a weighted value of the field curvature, astigmatism, distortion, dispersion, spherical aberration and coma of the imaging of the object point through the lens being less than a preset aberration threshold.

In an exemplary embodiment, the optimization variables and the lens parameter include surface patterns of the two surfaces of the lens, the curvature radius and physical radius of each of the surfaces, and the thickness of the lens, and the optimization variables further include the surface pattern, curvature radius, physical radius and conic coefficient of the image surface.

An exemplary embodiment further provides an apparatus for optimizing a lens of a virtual reality device including: a processing system; a memory storing thereon computer executable instructions which, when executed in the processing system, enable a method as described in any of the above method embodiments.

An exemplary embodiment further provides a computer readable storage medium storing thereon computer executable instructions which, when executed by a computing device, cause the computing device to implement a method as described in any of the above exemplary embodiments.

An exemplary embodiment further provides a computer program which comprises computer executable instructions which, when executed by a computing device, cause the computing device to implement a method as described in any of the above exemplary embodiments.

BRIEF DESCRIPTION OF THE DRAWINGS

The drawings are used to provide further understanding of the technical solutions of the disclosure, and constitute part of the specification, and they are used for explaining the technical solutions of the disclosure together with embodiments of the application and do not constitute a limitation to the technical solutions of the disclosure.

DETAILED DESCRIPTION

To make the objects, technical solutions and advantages of the disclosure clearer, in the following, exemplary embodiments of the disclosure will be described in detail in conjunction with the drawings. It is noted that, in a case of no conflict, the exemplary embodiments in the application and the features in the exemplary embodiments may be arbitrarily combined with each other.

The disclosure provides the following several specific exemplary embodiments, which may be combined with each other, and for an identical or similar concept or process, it may be no longer repeated in some embodiments.

A VR device is applied in the field of wearable device, used for example, for a user's entertainment and leisure. Such lenses have specific requirements for design. Not only is the lens required to have a good imaging effect, it is also required to have low weight, small volume and low cost, etc. Aberration in lens imaging is the main factor negatively affecting the display of the VR device. Aberration mainly includes field curvature, astigmatism, distortion, dispersion, spherical aberration and coma. Therefore, optimization of a lens in the VR device is to reduce various aberrations in lens imaging as much as possible.

Based on the application scenario of a VR device, a display effect of a large field of view is usually required. In an application scenario of a large field of view, it will be very difficult to optimize the two aberrations of field curvature and astigmatism using traditional methods of planar image optimization. The imaging ways of a camera, a telescope and a microscope are usually all based on a planar object being imaged into a planar image, and both the telescope and the microscope are a combination of a small field of view and multiple lenses, so the design approach of such lenses in the above products are not suitable for the lens of the VR device.

Figure 1:
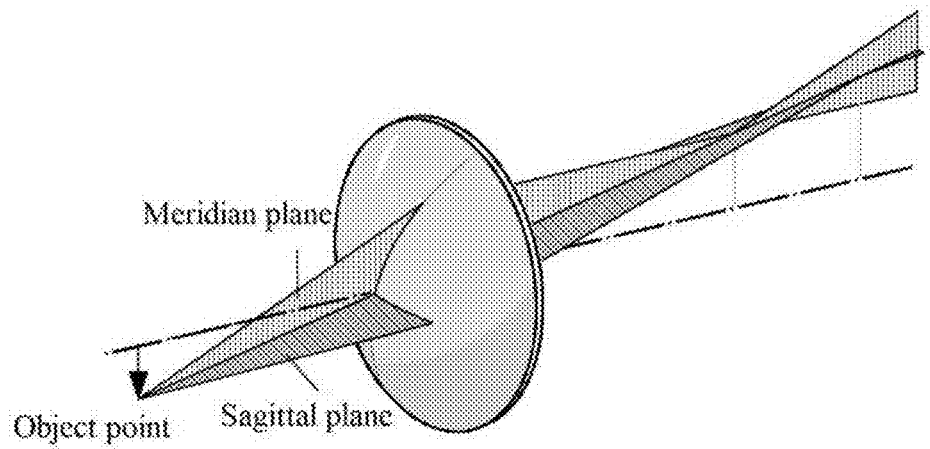
FIG. 1 is a schematic diagram of a meridian plane and a sagittal plane in lens imaging.

To illustrate the two aberrations of field curvature and astigmatism, the meridian plane and the sagittal plane are introduced first. As shown in FIG. 1, it is a schematic diagram of a meridian plane and a sagittal plane in lens imaging. When considering light emitted by an off-axis object point, it is usually necessary to divide into two mutually perpendicular planes to better analyze and represent aberrations due to asymmetry caused by being off-axis. It is generally optically agreed that the plane composed of an off-axis object point and an optical axis is a meridian plane, as shown by the black shadow in FIG. 1, and what is perpendicular to the meridian plane is a sagittal plane, as shown by the gray shadow in FIG. 1. It is noted that, the object in this document is based on a user's pupil and refers to a point which is imaged with the user's pupil as a light emitting point. That is, since the user's pupil is circular and not just one point, there will be many off-axis object points in FIG. 1, and multiple meridian planes and sagittal planes will also be formed. FIG. 1 is shown with just one set of meridian and sagittal planes as an example.

Figure 2:
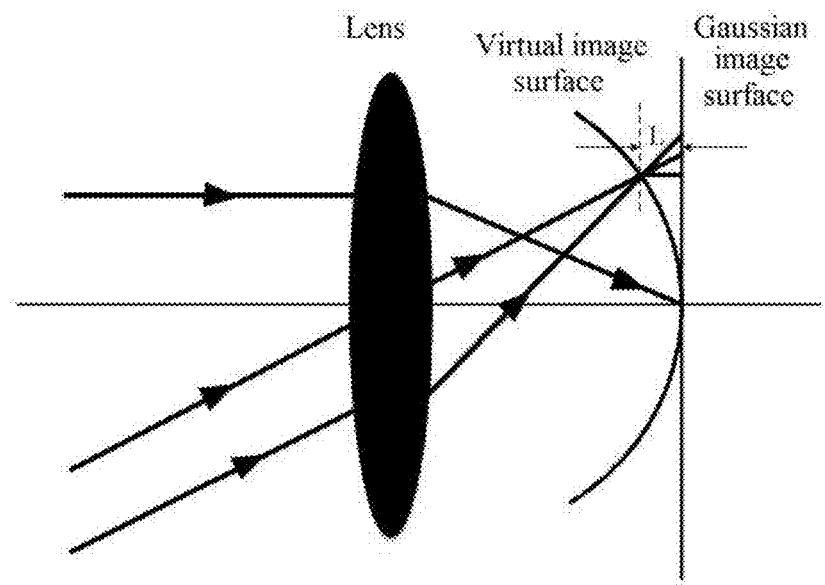
FIG. 2 is a schematic diagram of the aberration of field curvature in lens imaging.

As shown in FIG. 2, it is a schematic diagram of the aberration of field curvature in lens imaging. In a case of ideal imaging, the imaging of a planar object is a planar image. However, owing to the existence of field curvature, after passing through a lens, the point at which the actual light beam emitted by an off-axis object point is focused is usually not in an ideal image plane (also called Gaussian image surface), but in a curved image surface (virtual image surface). As shown in FIG. 2, the distance from the intersection of a light beam in the meridian plane to the Gaussian image surface along the direction of the optical axis is called the meridional field curvature, namely, the length of the L segment in FIG. 2. Likewise, the distance from the intersection of a light beam in the sagittal plane to the Gaussian image surface along the direction of the optical axis is called the sagittal field curvature. An image surface constituted by meridional image points (points at which light beams in the meridian plane converge on the virtual image surface) of various fields of view is called a meridional image surface, and an image surface constituted by sagittal image points (points at which light beams in the sagittal plane converge on the virtual image surface) is called a sagittal image surface. Both the meridional image surface and the sagittal image surface are a rotated curved surface, that is, a planar object is transformed into a revolved curved surface after lens imaging.

Based on the requirement of a VR device for a large field of view, the field curvature will be very large, and the difficulty in optimization design of field curvature and astigmatism will also be very large. In the related arts, it has not been accomplished that correction of the aberrations of field curvature and astigmatism is done by a single lens. In a single lens design scheme of a related VR device, a Fresnel lens is adopted mainly for correcting field curvature and coma, dispersion and distortion are solved by means of image processing, spherical aberration cannot be completely corrected and becomes an important factor affecting the imaging quality, and this scheme does not solve the problem of design optimization of filed curvature, astigmatism, etc.

In the case of a large field of view, main aberrations further include distortion and dispersion. The distortion will be mainly explained. The height of the intersection of main light of a different field of view after passing through an optical lens with the Gaussian image surface is not equal to an ideal image height, the difference therebetween is the distortion, and the distortion does not affect the clarity of the image and is just a function of the field of view.

Figure 3:
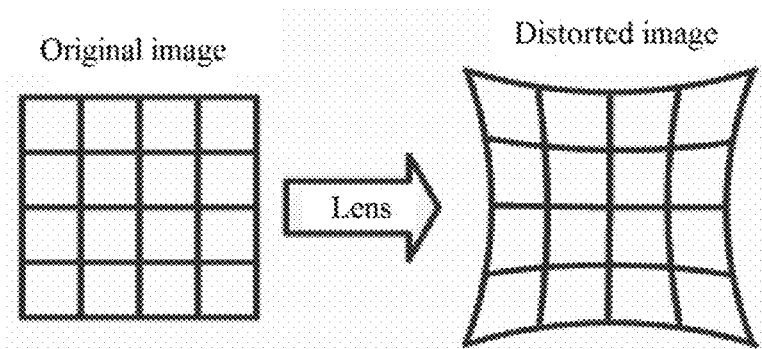
FIG. 3 is a schematic diagram of the aberration of distortion in lens imaging.
Figure 4:
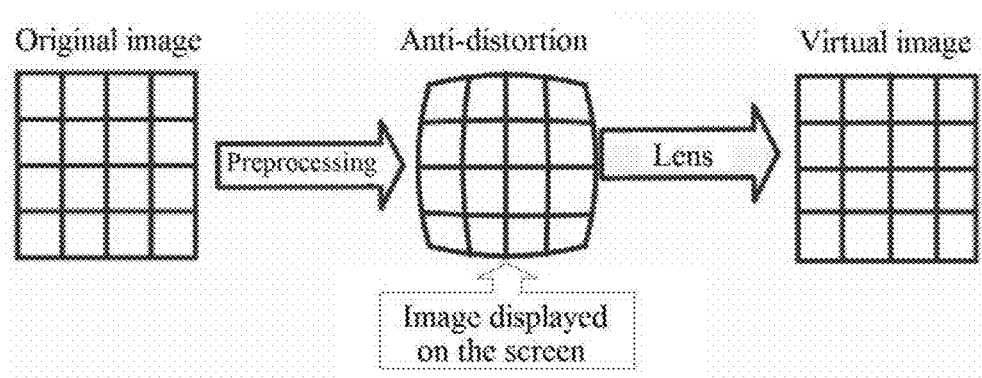
FIG. 4 is a schematic diagram of processing distortion in lens imaging.
Figure 5:
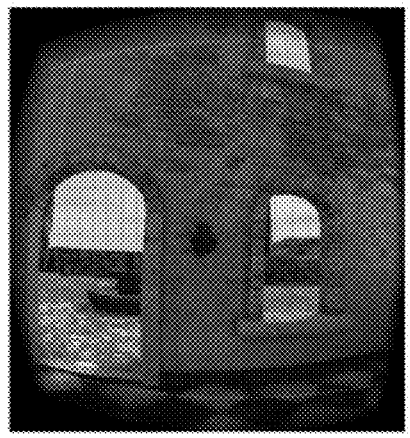
FIG. 5 is an image after performing distortion preprocessing on lens imaging.

In the single lens optical system of the related VR device, the characteristic that a human eye acts as the exit pupil of the system causes the distortion to be pillow-shaped. As shown in FIG. 3, it is a schematic diagram of the aberration of distortion in lens imaging. Before distortion, the grid image is normal, and its horizontal and vertical lines are straight. After a lens, the grid seen by the human eye is changed into an image like a pillow due to the lens, that is, distortion happens. A current processing approach is such that software preprocesses a video or image source. As shown in FIG. 4, it is a schematic diagram of processing distortion in lens imaging. That is, a normal image is processed in advance, such that it becomes a barrel-shaped image, and thus it will become a normal grid image after the pillow-shaped distortion of the lens. However, such an approach of processing distortion will result in a problem of resolution loss. FIG. 5 shows an image after performing distortion preprocessing on lens imaging, which corresponds to the barrel-shaped image in FIG. 4. It can be seen that, the black image-free part around the screen is a wasted area. After amplified, a normal rectangular image may be seen. As such, except for the distortion-free points at the center, there is a loss of resolution for the image elsewhere, and the larger the distortion, the greater the loss of resolution. Shown in the following table 1 is a change trend of the resolution of object point imaging with the increase of the angle of field of view.

TABLE 1

| | Angle of field of view | | | | | | | |
|---|---|---|---|---|---|---|---|---|
| | 0° | 5° | 10° | 15° | 20° | 25° | 30° | 35° | 40° |
| Resolution | 100% | 92% | 82% | 80% | 76% | 70% | 60% | 56% | 50% |

It can be seen that, when the angle of field of view is 0°, the resolution of object point imaging is the highest, and the resolution of object point imaging near the human eye fovea is high; and outwards from the human eye fovea, the resolution of object point imaging decreases with the increase of the angle of field of view. The processing of dispersion is done at the same time as the preprocessing of the distortion, and will not be illustrated separately here.

In the above, some optical phenomena and concepts in lens imaging, and the concepts of major aberrations affecting the imaging effect and solutions in related arts, are introduced briefly. Clearly, the one-piece lens of the related VR device does not satisfactorily solve the problem of aberration.

Figure 6:
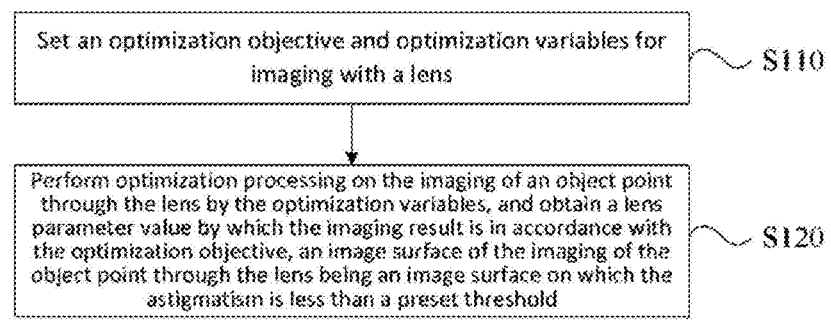
FIG. 6 is a flow chart of a method for optimizing a lens of a virtual reality device provided by an exemplary embodiment.

FIG. 6 is a flow chart of a method for optimizing a lens of a virtual reality device provided by an exemplary embodiment. The method for optimizing a lens of a virtual reality device provided by an exemplary embodiment may include the following steps.

S110, an optimization objective and optimization variables for imaging with a lens are set.

The method for optimizing a lens of a virtual reality device provided by the embodiment of the disclosure is a scheme of design optimization for a lens of a VR device. The set optimization objective and optimization variables may be considered based on the perspective of an actual application scenario and user. Design requirements in an actual application for example include the following. Firstly, based on the perspective of a user's use, in order to satisfy the requirements for volume and weight, the VR device in the scheme of the exemplary embodiment adopts a one-piece lens; secondly, the exit pupil of the VR device is a human eye, the pupil distance and the exit pupil may be considered, for example, the pupil distance will limit the size and shape of the lens, and the human eye directly sets the exit pupil position and size of the lens in the VR device, for instance, the size of the exit pupil is 2-8 mm, and the exit pupil distance is 10-20 mm; and thirdly, due to the application scenario of the VR device and the user's usage demands, there is a requirement for a large field of view for lens imaging. In addition, the optimization variables may be the above-mentioned pupil distance, the exit pupil distance, the surface pattern and thickness of the lens, and all parameter variables related with computation in the lens optimization process.

The optimization objective of the VR device in the exemplary embodiment is different from the design objective of a traditional optical lens, which is usually one of multiple lenses and a small field of view for the traditional lens. Based on the actual situation in which the design objective of the traditional lens is different and the one-piece lens in the VR device cannot solve various aberration problems, how to design the one-piece lens of the VR device and how to improve the imaging effect of the one-piece lens in the VR device is an objective of optimizing the lens in the exemplary embodiment.

S120, optimization processing is performed on the imaging of an object point through the lens by the optimization variables, and a lens parameter value is obtained by which the imaging result is in accordance with the optimization objective, an image surface of the imaging of the object point through the lens being an image surface on which the astigmatism is less than a preset threshold.

In the exemplary embodiment, after the optimization objective and the optimization variables are set according to the requirements of an actual design, optimization processing may be performed on the imaging of an object point through the lens by the optimization variables. The object point in the exemplary embodiment is an exit pupil point based on the pupil of the human eye. In the process of optimizing the imaging of the object point, since the optimization variables are variable, it may be possible to change part or all of the optimization variables by constant adjustment, so as to find optimization variable values by which the imaging result is accordance with the set optimization objective. These optimization variable values include a lens parameter value, and the lens parameter value may be employed later to manufacture the lens, to obtain a VR device whose imaging result meets the optimization objective. The process of adjusting the optimization variables may be a process of computer software processing. For example, computational formulae related with various aberrations in lens imaging are written into a computer program in the form of an objective function, the program is iterated for the objective function by constantly adjusting the objective variables in the objective function, the program stops iteration after the set optimization objective is arrived at after enough iterations, and numerical values of objective parameters which satisfy the optimization objective are obtained. At this point, the obtained numerical values of objective parameters include the lens parameter value.

Figure 7:
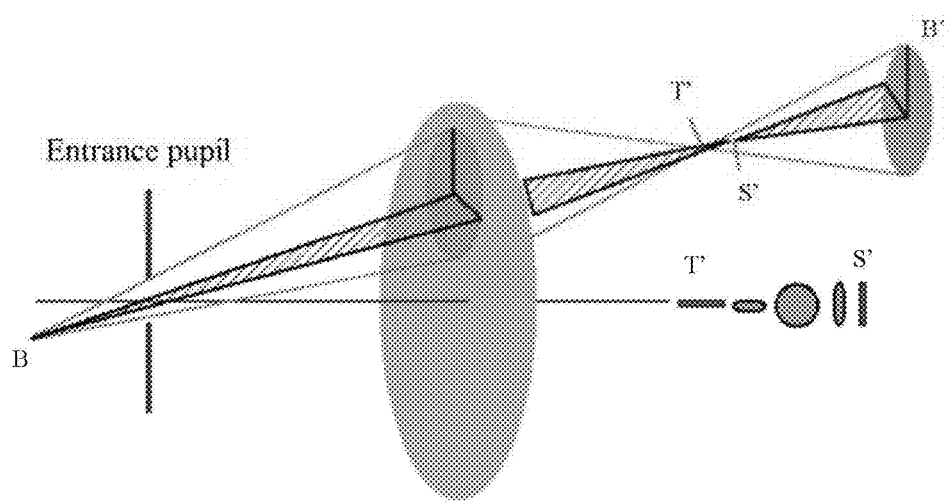
FIG. 7 is a schematic diagram of the aberration of astigmatism in lens imaging.

In a method provided by an exemplary embodiment, one of the design requirements is such that an image surface of the imaging of an object point through the lens is an image surface on which the astigmatism is less than a preset threshold, that is, the astigmatism is required to be infinitely close to zero. FIG. 2 illustrates that both the meridional and sagittal image surfaces are curved surfaces symmetrical with respect to the optical axis. Shown in FIG. 7 is a schematic diagram of the aberration of astigmatism in lens imaging. When the meridional image surface does not coincide with the sagittal image surface, the axial distance therebetween is called the astigmatism, namely, the axial distance between the meridional image point T' and the sagittal image point S' in FIG. 7. When the astigmatism is zero, the meridional image surface coincides with the sagittal image surface, but the curvature of the image surfaces still exists, and at this point, the curved image surface is called a Petzval field curvature image surface (Petzval image surface for short hereinafter). In the embodiment of the disclosure, the image surface of the imaging of the object point is right the Petzval image surface, that is, the method provided by the embodiment of the disclosure optimizes the lens on the Petzval image surface, namely, an image surface on which the astigmatism is infinitely close to zero is directly selected for optimization in the optimization method.

Here, the imaging features of the Petzval field curvature image surface are analyzed. Intersections of Light groups (light that has an intersection on the image surface is a light group) with different apertures in the same field of view are deviated from the Gaussian image surface along the direction of the optical axis, and in such a case, the image surface is curved, that is, it is no longer a Gaussian image surface. For other optical devices, for example, a camera, the receivers in their image planes are planar; and the curved Petzval image surface is a light spot on the Gaussian image surface except for the point on the optical axis, and the image quality is blurred. However, for a human eye, the focus of the human eye is adjustable, and in a VR device, the human eye may be actively focused on the curved Petzval image surface. Based on this special feature, limitations on lens optimization for the VR device on the Petzval image surface are much looser.

Figure 8:
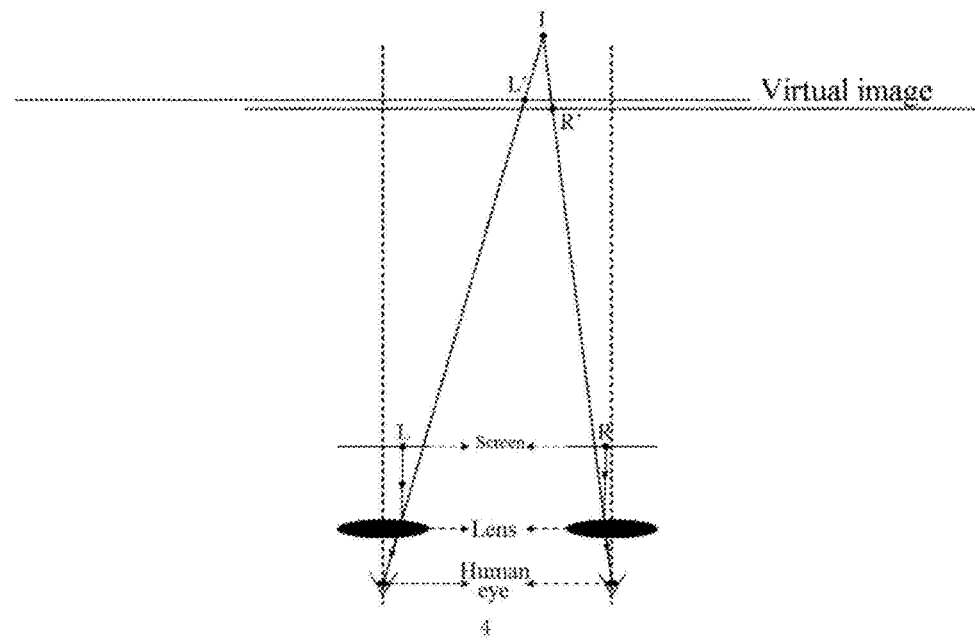
FIG. 8 is a schematic diagram of forming 3D imaging by a principle of parallax on a planar image surface.

FIG. 8 is a schematic diagram of forming 3D imaging by a principle of parallax on a planar image surface. In the figure, L and R are pixels representative of the same object point on a left screen and a right screen in the VR device, respectively; after refracted by lenses, they are amplified into two object points L' and R' on ideal image surfaces in the distance; and the left eye sees L', the right eye sees R', so stereo vision is formed in the human brain, and the object point I at a depth is seen.

Figure 9:
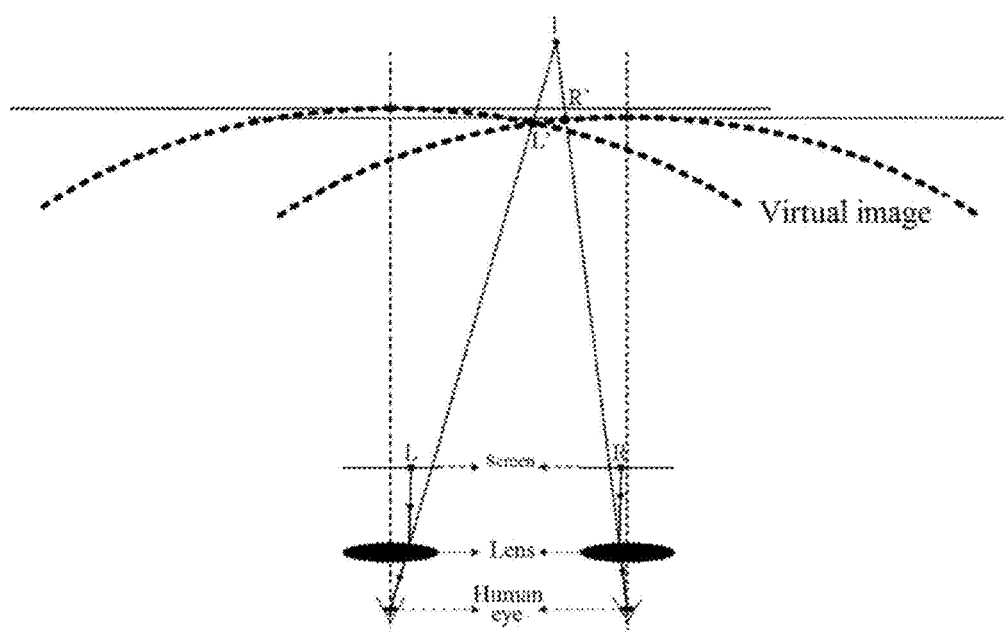
FIG. 9 is a schematic diagram of forming 3D imaging by a principle of parallax on a Petzval image surface.
Figure 10:
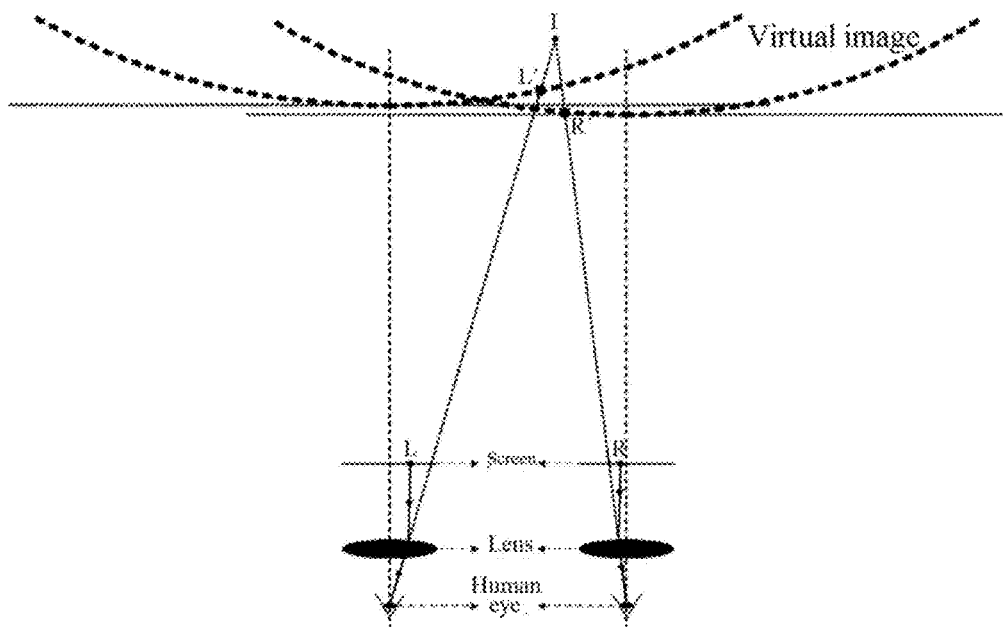
FIG. 10 is a schematic diagram of forming 3D imaging by another principle of parallax on a Petzval image surface.

After optical software simulation, it is demonstrated that on the Petzval image surface, the above-described 3D stereoscopic depth is also unaffected. FIG. 9 is a schematic diagram of forming 3D imaging by a principle of parallax on a Petzval image surface, and FIG. 10 is a schematic diagram of forming 3D imaging by another principle of parallax on a Petzval image surface. In FIG. 9 and FIG. 10, the surface pattern parameter of the lens is different, and the bending direction of the imaging curved surface is different. Likewise, L and R in the figures are pixels representative of the same object point on a left screen and a right screen in the VR device; after refracted by lenses, they are amplified into two image points L' and R' on virtual image surfaces in the distance; and at this point, the two image points are on curved image surfaces, and according to the characteristics of field curvature, the two points are still on the same lines connecting the human eyes and the image points on the plane in the figures, so the left eye sees L', the right eye sees R', stereo vision is formed in the human brain, and the object point I forming the original stereoscopic depth will still be seen. Therefore, the Petzval field curvature does not affect the formation of a stereoscopic depth in the VR device.

The optimization method provided by the exemplary embodiment is a feasible optimization approach by taking into account that the VR device adopts a one-piece lens and has the requirement for a large field of view and the difficulty in aberration optimization is great, and based on the human eye visual characteristics, considering performing elimination and attenuation processing on the aberrations of the lens imaging in the VR device on the curved image surface of the Petzval field curvature, wherein it has been illustrated above that optimization of the lens of the VR device on the Petzval image surface does not have an adverse impact on the optical effect of the lens imaging.

In the related VR devices, the weight and volume of the three-piece and two-piece lenses are large, and the form of the two-piece lens is special, processing and shaping the lens is difficult, and the difficulty of assembly is high; and although there is a one-piece lens, the difficulty in aberration optimization is high, and it does not solve the problem of design optimization for field curvature, astigmatism, etc., which causes that the imaging quality of the lens is low and it is difficult to meet the user's needs.

In the method for optimizing a lens of a virtual reality device provided by the exemplary embodiment, by setting an optimization objective and optimization variables for lens imaging and performing optimization processing on the imaging of an object point through the lens by the optimization variables, that is, optimizing the imaging result, a lens parameter value by which the imaging result is in accordance with the optimization objective is obtained, wherein an image surface of the imaging of the object point through the lens is an image surface on which the astigmatism is less than a preset threshold (ideally, an image surface when the astigmatism is zero, i.e., Petzval image surface), and the optimization objective, the optimization variables and the image surface of the lens imaging are all designed based on the human eye visual characteristics. Based on the human eye visual characteristics, the method for optimizing a lens of a virtual reality device provided by the embodiment of the disclosure performs elimination and attenuation processing on the aberrations of the lens imaging in the VR device on the curved image surface of the Petzval field curvature, causing that the lens obtained after the optimization may meet the requirement that various aberrations are as small as possible, which may simplify the difficulty in optimization and guarantee the imaging quality of the lens. More importantly, the method will not bring about an adverse impact on the optical effect of the lens imaging, may give consideration to the advantages of portability and low cost, etc. by employing only one piece of lens.

Figure 11:
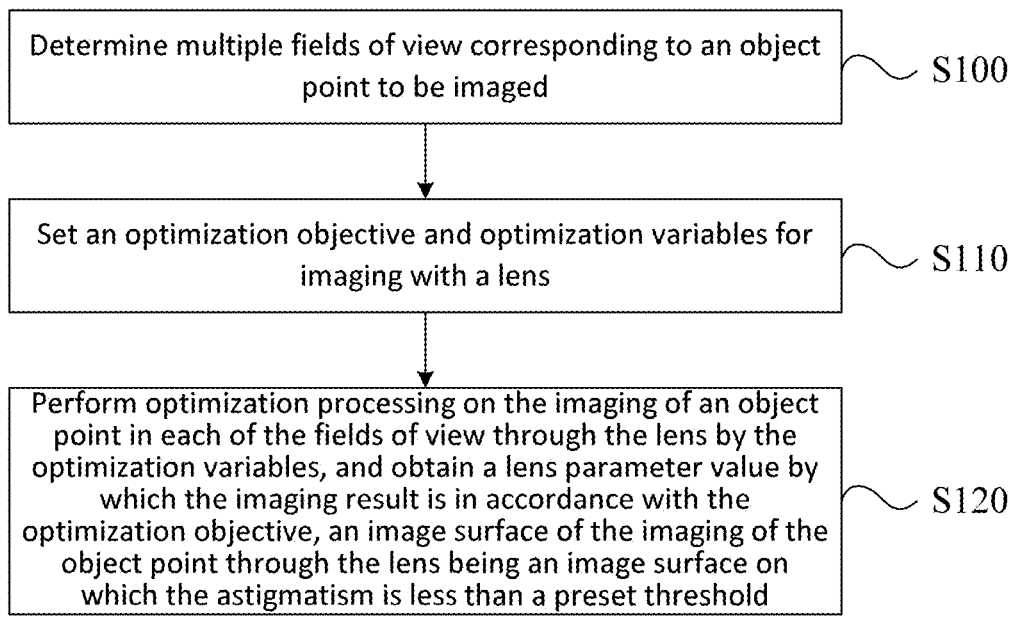
FIG. 11 is a flow chart of another method for optimizing a lens of a virtual reality device provided by an exemplary embodiment.

FIG. 11 is a flow chart of the steps according to another method for optimizing a lens of a virtual reality device provided by an exemplary embodiment. On the basis of the exemplary embodiment as shown in FIG. 6, before S110, the method provided by this exemplary embodiment may further include: S100, determining multiple fields of view corresponding to an object point to be imaged.

Here, the step S110 will not be repeated any longer. As described above, S120 includes: performing optimization processing on the imaging of an object point in each of the fields of view through the lens by the optimization variables, and obtaining a lens parameter value by which the imaging result is in accordance with the optimization objective.

Figure 12:
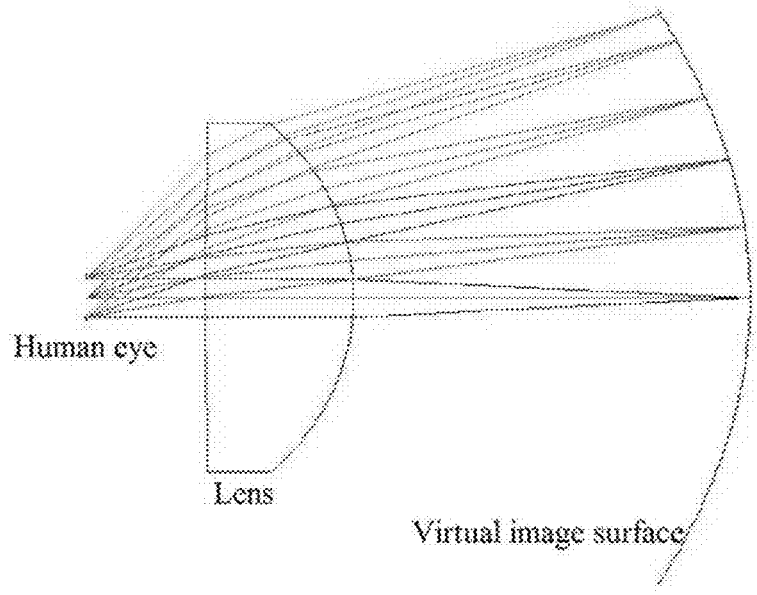
FIG. 12 is a schematic diagram of object point imaging in a method for optimizing a lens of a virtual reality device provided by an exemplary embodiment.

In an exemplary embodiment, multiple fields of view may be set according to an actual situation. The fields of view may be set in one direction from the optical axis, for example, the fields of view determined in a design are 0°, 10°, 20°, 30°, 40°, 45°. In view of the symmetry with respect to the optical axis, a field of view of the VR device in a practical application is twice the designed maximum. After the multiple fields of view are set, an optical design program may be programmed in a computer to trace object points emanating from the set fields of view according to the basic optical principles (for example, including the law of light propagation along a straight line and the law of refraction, etc.) and trace the condition of image points when the object points arrive at the Petzval image surface. As shown in FIG. 12, it is a schematic diagram of object point imaging in a method for optimizing a lens of a virtual reality device provided by an exemplary embodiment. It can be seen that, image points on the Petzval image surfaces which are imaged by object points on parallel light beams are coincident.

In an exemplary embodiment, the process of optimization processing may be a process of computer software processing, and the implementation way of performing optimization processing on the imaging of an object point by a computer program, namely, S120, may further include the following steps:

step 1, generating an objective function according to the optimization objective and the optimization variables;

step 2, determining initial values of the optimization variables;

step 3, obtaining an imaging result of the object point through the lens according to the initial values and the objective function; and step 4, adjusting the initial values of the optimization variables according to the comparison of the imaging result with the optimization objective, and obtaining the imaging result of the object point through the lens according to the adjusted initial values of the optimization variables and the objective function, until a lens parameter value is obtained by which the imaging result is accordance with the optimization objective.

In an exemplary embodiment, the set optimization objective, optimization variables and the computational approach of various aberrations to be processed may be programmed in a computer program in the form of program code, and combined with some optimization algorithms (e.g., least square method, damped least square method, some global optimization algorithms, etc.) to generate an objective function, and subsequently, an imaging result of the object point through the lens is obtained according to the determined initial values and objective function. That is, tracing of the imaging result of the object point is simulated by means of substituting the initial values into the objective function, the imaging result is compared with the set optimization objective, the difference between the aberration of the current lens imaging and the optimization objective may be known from the comparison, the initial values of the optimization variables may be adjusted according to the compared difference, that is, a parameter related with the lens imaging is adjusted, and the imaging result of the object point through the lens is obtained by constantly adjusting the initial values of the optimization variables, until a lens parameter value is obtained by which the imaging result is accordance with the optimization objective, that is, the optimization of the lens is accomplished.

It is noted that, in an approach of determining initial values of the optimization variables, the initial values may be set by the designer based on experience, may also be generated by the computer program by default, or may further be set according to a parameter of a related better lens, which will not be specifically defined by the exemplary embodiment.

The feasibility of optimizing an aberration of the lens imaging on the Petzval image surface has been elucidated in the above exemplary embodiment. In some exemplary embodiments, the optimization includes not only optimization of field curvature and astigmatism, but also optimization of aberrations such as distortion, dispersion, spherical aberration and coma, etc. The approach of optimization is equally the steps S100-S120, including the above further steps 1-4, and the variable values which meet the optimization objective are obtained after multiple iterative computations.

It has been described in the above exemplary embodiments that the optimization variables include a variable(s) related with the lens. In an exemplary embodiment, the optimization variables and the lens parameter in the embodiments of the disclosure may include surface patterns of the two surfaces of the lens, the curvature radius and physical radius of each of the surfaces, and the thickness of the lens, and in addition, the optimization variables may further include some variables in the computational process, for example, the surface pattern, curvature radius, physical radius and conic coefficient of the image surface, etc. Table 2, discloses exemplary constants and variables involved in the process of optimization computation in an exemplary embodiment.

TABLE 2

| Surface No. | Surface pattern | Curvature radius | Thickness | Material | Physical radius | Conic coefficient | Even-order coefficient |
|---|---|---|---|---|---|---|---|
| 0 | Standard surface | — | — | — | 0 | 0 | 0 |
| 1 | Standard surface | — | 12 | — | 2 | 0 | 0 |
| 2 | Even aspheric surface | 290.229 | 15 | PMMA | 14.288 | 0 | 0.0016 |
| 3 | Even aspheric surface | −26.917 | 39.966 | PMMA | 17.584 | 0 | −0.0034 |
| 4 | Even aspheric surface | −45.34 | 0 | — | 28.932 | −1 | 0 |

The surface Nos. in table 2 are successive numbers of all the surfaces in the process of imaging with a lens, 0 indicates a surface of incidence of light, 1 indicates a surface of the exit pupil of a human eye, the surface patterns of both 0 and 1 are standard surface (STANDARD), 2 and 3 are the two surfaces of the lens, 4 is a curved image surface (i.e., Petzval image surface) of the imaging, and the surface patterns of 2 to 4 are all even aspheric surfaces (EVENASPH). In the column of thickness, a thickness value represents a perpendicular distance from a current surface to a next surface; for a surface (No. 2) of the lens, 15 is the perpendicular distance from the surface (No. 2) to another surface (No. 3), namely, the actual thickness of the lens; and 39.966 is the perpendicular distance from the surface No. 3 to the surface (No. 4) (i.e., the Petzval image surface). The material of the lens in exemplary embodiments, Poly Methyl Methacrylate (PMMA for short) may be selected, namely, Acrylic plastic. As compared with an optical glass material, an aspheric lens that adopts a plastic material can make processing easier and reduce the cost of manufacturing the lens, since the glass material needs traditional complex operations such as grinding, polishing, etc., whereas for the plastic material, batch production may be implemented by injection molding and the shape is not limited.

It is noted that, the table 2 only schematically lists content of some optimization variables and some constants related with computation, and the optimization variables in the exemplary embodiments are not limited to the content in the table 2, for example, there may further be higher order coefficients above 4 order behind the even-order coefficient, which will not be listed one by one.

Employing the above optimization method provided by the exemplary embodiments, for example, the surface patterns of the lens and surface pattern of the image surface obtained after optimization are curved and are even aspheric surfaces (EVENASPH), and other non-lens surfaces are standard surfaces (STANDARD) in the table 2. In the following, the computational formula of an even aspheric surface will be described:

$$z = \frac{r^3}{R\left(1 + \sqrt{1 - \frac{(1+k)r^2}{R^2}}\right)} + Ar^2 + Br^4 + Cr^6 = Dr^8 + Er^{10} + Fr^{12} + \ldots ; \quad (1)$$

Figure 13:
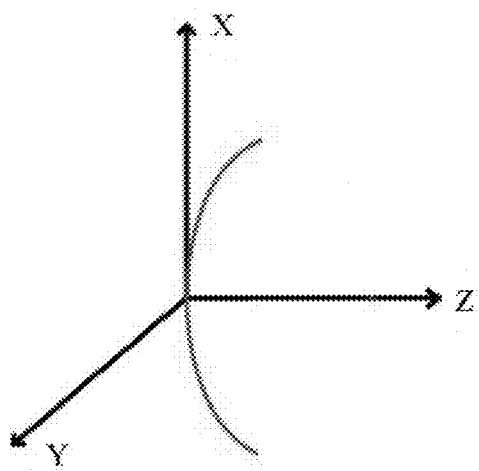
FIG. 13 is a schematic diagram of a coordinate system corresponding to a computational formula of an even-order aspheric surface.

In the equation (1), z indicates a horizontal coordinate, the parameter R indicates a curvature radius value of the aspheric surface, k indicates a conic coefficient, r indicates a radial coordinate, A indicates a 2-order aspheric coefficient, B indicates a 4-order aspheric coefficient, C indicates a 6-order aspheric coefficient, D indicates a 8-order aspheric coefficient, E indicates a 10-order aspheric coefficient, and F indicates a 12-order aspheric coefficient. As shown in FIG. 13, it is a schematic diagram of a coordinate system corresponding to a computational formula of an even-order aspheric surface. It is noted that, $Ar^2$ and $Br^4$, etc. in equation (1) schematically indicate even-order coefficients of the lens when the surface patterns of the lens are even aspheric surfaces; and in a practical application, the computational formula of a surface pattern of the lens may only include lower order, for example, $Ar^2$ and $Br^4$, or also may include higher order. The higher the even order in the computational formula, the more the variables are for which computation is performed at the time of optimization processing, and the closer the optimization result may be to the optimization objective.

In the computational process of optimizing a lens by the above formula, the surface shape of an even aspheric surface may be determined by determining the coordinate of each point on the even aspheric surface, the size, shape, etc. of the even aspheric surface may be determined according to the coefficients R, A, B, C, etc., and the respective coefficients in the equation of even aspheric surface of the different effective surfaces (i.e., surface 2 and surface 3) of the same lens are different, which may better balance an optical aberration. In simulation, the constant parameters and the variable parameters in the table 2 may be referred to, wherein the conic coefficient indicates the coefficient k in the equation of even aspheric surface, the even-order coefficient and the content not shown behind it are even-order coefficients A, B, C, D, etc., and higher order coefficients above 4 order are omitted.

In the above exemplary embodiments, it has been described that the optimization objective in the optimization method provided by the exemplary embodiments of the disclosure is set based on the human eye characteristics. In the following embodiments, an approach of setting the optimization objective will be described in detail.

The optimization objective in the exemplary embodiments of the disclosure may include:

a first aspect, a light spot of the imaging of the object point through the lens on the image surface (i.e., Petzval image surface) meeting a first preset condition; and a second aspect, an aberration of the imaging of the object point through the lens meeting a second preset condition.

In the first aspect, for the characteristics of the light spot of the imaging of the object point on the image surface, based on the human eye visual system, the light spots of standard red, green, blue (RGB for short) trichromatic light may be considered, and in a practical simulation computation for light spot tracing, the wavelengths of the trichromatic light are 0.486 um, 0.587 um and 0.656 um, respectively.

In an exemplary embodiment, an implementation of a light spot of the object point on the image surface meeting a first preset condition may include one or more of the following:

first, the root-mean-square radius of the red light spot, the green light spot and the blue light spot of the imaging of the object point on the image surface being less than a first radius value; and second, the geometric radius of the red light spot, the green light spot and the blue light spot of the imaging of the object point on the image surface being less than a second radius value.

Figure 14:
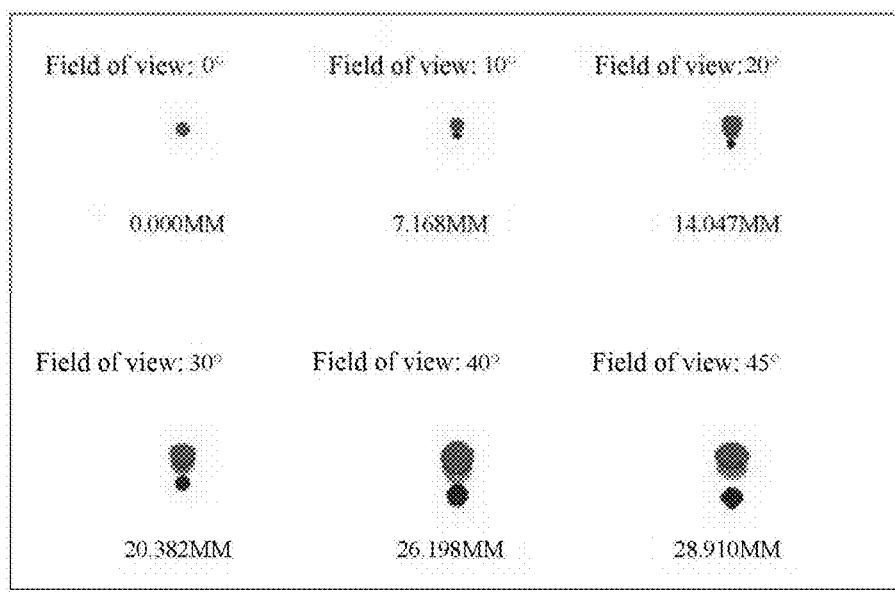
FIG. 14 is a dot matrix diagram of light spots of an object point on an image surface in a method for optimizing a lens of a virtual reality device provided by an exemplary embodiment.

In a design of an optical lens, the effect of the light spot at the time of imaging is direct reflection of the image quality, and one of optimization objectives set by the embodiments of the disclosure is to optimize the light spot effect of the object point on the Petzval image surface. As shown in FIG. 14, it is a dot matrix diagram of light spots of an object point on an image surface in a method for optimizing a lens of a virtual reality device provided by an embodiment of the disclosure. In the figure, light spot effects of trichromatic light of the object point on the image surface in the set individual fields of view are shown, and the six points in the figure are light spot conditions of the imaging of the object point with trichromatic light in the different fields of view. The distance between the object point and the optical axis is different in a different field of view. When the field of view is 0°, the object point is on the optical axis and the distance is 0. When the field of view is 45°, the distance between object point and the optical axis is the largest, and is 28.910 mm. It can be seen that, when the field of view is 0°, the light spots of the RGB trichromatic light are a point, and coincident on the image surface; and when the field of view is 45°, the light spots of the RGB trichromatic light are a little bigger on the image surface, and are not completely coincident. In the embodiments of the disclosure, to verify whether the light spots of the RGB trichromatic light of the imaging of the object point on the image surface meet the optimization objective, it may be based on quantization of the root-mean-square radius and the geometric radius of the trichromatic light spots. According to the simulation result, the radius values of the light spots of the RGB trichromatic light in the individual fields of view are obtained, which may be referred to the following table 3.

TABLE 3

| | No. of field of view | | | | | |
|---|---|---|---|---|---|---|
| | 1 | 2 | 3 | 4 | 5 | 6 |
| Angle of field of view | 0° | 10° | 20° | 30° | 40° | 45° |
| Root-mean-square radius (um) | 11.776 | 30.214 | 61.521 | 94.436 | 134.158 | 148.320 |
| Geometric radius (um) | 25.890 | 51.157 | 110.519 | 186.552 | 293.430 | 302.664 |

It may be seen from the table 3 that, the numerical value of the root-mean-square (RMS for short) radius in the largest field of view (45°) is 148 um, which is clearly reduced very much as compared with about 400 um in the related lens. The above optimization result is just an effect after optimization performed by the optimization method provided by the above exemplary embodiment, and if it proceeds to correct dispersion by software, the root-mean-square radii of the trichromatic light spots in FIG. 14 and table 3 will be smaller.

In the second aspect, for optimization of an aberration of the imaging of the object point on the image surface, the aberration to be optimized usually includes field curvature, astigmatism, distortion, dispersion, spherical aberration and coma.

In an implementation of the exemplary embodiments, starting from the concept of an optimized design, optimization objectives which are consistent with the human eye visual characteristics may be set for these aberrations, which for example include one or more of the following:

first, the positions of the meridional field curvature and the sagittal field curvature of the imaging of the object point being close to each other, such that the astigmatism is less than a preset threshold;

second, the distortion and dispersion of the imaging of the object point being less than a preset threshold within a preset field of vision; and third, the spherical aberration and the coma of the imaging of the object point on the image surface being less than a preset threshold.

Optimizing the imaging of the object point through the lens on the Petzval image surface by the exemplary embodiments has been described above. That is, setting the astigmatism to zero in the optimization conditions is an ideal situation, multiple aberrations are usually taken into account in the optimization design, and therefore, the astigmatism is controlled as much as possible to be infinitely close to zero, that is, the meridional field curvature and the sagittal field curvature are controlled to be as close to each other as possible; in view of the limit of the human eye resolution, the distortion and the dispersion may be controlled to be as small as possible in a field of vision of 30°; and in addition, the two aberrations of spherical aberration and coma are controlled to be as small as possible on the curved image surface (i.e., Petzval image surface). On the basis of the human eye visual characteristics and in combination with the characteristic of software preprocessing which may be adopted in the lens optimization, the above optimization objectives can achieve a lens design with a high image quality under the condition of a one-piece lens, and simplify the design process of a lens in a VR device.

In another implementation of the exemplary embodiments of the disclosure, that an aberration meets a second preset condition may include: a weighted value of the field curvature, astigmatism, distortion, dispersion, spherical aberration and coma of the imaging of the object point through the lens being less than a preset aberration threshold.

In the exemplary embodiment, starting from a computed value of the aberrations of the imaging of the object point being a design objective, it is required that the value of each term in the aberrations is as small as possible, that is, the weighted value of all the aberration values is as small as possible (the effect of the value of each term in the aberrations on the vision corresponds to a respective weighting coefficient), namely, the resulting aberration values are as small as possible.

Figure 15:
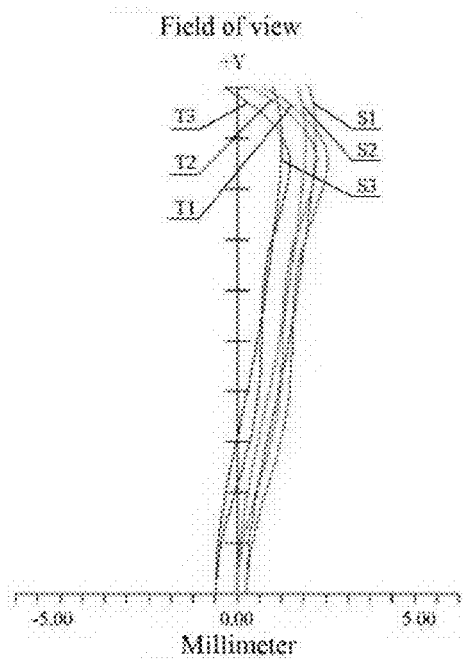
FIG. 15 is a schematic diagram of optimized field curvature in a method for optimizing a lens of a virtual reality device provided by an exemplary embodiment.
Figure 16:
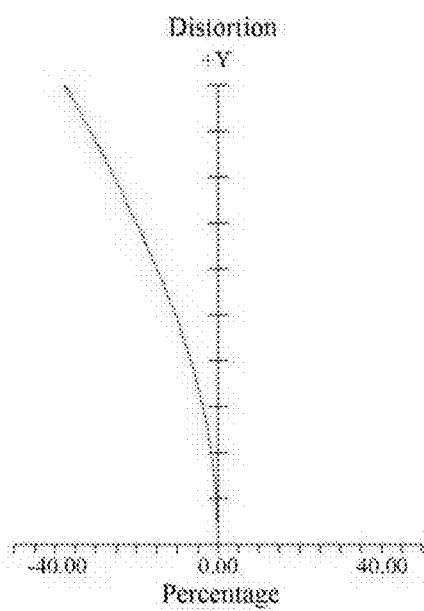
FIG. 16 is a schematic diagram of optimized distortion in a method for optimizing a lens of a virtual reality device provided by an exemplary embodiment.

The method for optimizing a lens of a virtual reality device provided by exemplary embodiments of the disclosure may reduce the value of each term in the aberrations as much as possible, as shown in FIG. 15 and FIG. 16. FIG. 15 is a schematic diagram of optimized field curvature in a method for optimizing a lens of a virtual reality device provided by an embodiment of the disclosure. FIG. 16 is a schematic diagram of optimized distortion in a method for optimizing a lens of a virtual reality device provided by an embodiment of the disclosure. T1, T2, and T3 in FIG. 15 are respectively curves of meridional field curvature corresponding to blue light, green light and red light, and S1, S2, and S3 are respectively curves of sagittal field curvature corresponding to blue light, green light and red light. The numerical values of the meridional field curvature and the sagittal field curvature are very close to each other, and less than 2 um, and this value of astigmatism is less than that of a two-piece lens in a related VR device. In FIG. 16, the value of distortion is less than 40% in the field of view of 45°, and thus the loss of resolution may satisfy the needs of the human eye perspective.

The method for optimizing a lens of a virtual reality device provided by exemplary embodiments sets the optimization objective and the optimization variables based on the human eye visual characteristics, and optimizes an aberration of the imaging of the object point on the Petzval image surface, wherein the software preprocessing capabilities of the VR device are combined in the process of optimization processing, which can better ascertain, simplify and optimize the design approach of the lens in the VR device, and obtain the lens with a high image quality.

Based on the method for optimizing a lens of a virtual reality device provided by the above individual exemplary embodiments, an exemplary embodiment further provides an apparatus for optimizing a lens of a virtual reality device, which is used for performing the method for optimizing a lens of a virtual reality device provided by any of the above embodiments.

Figure 17:
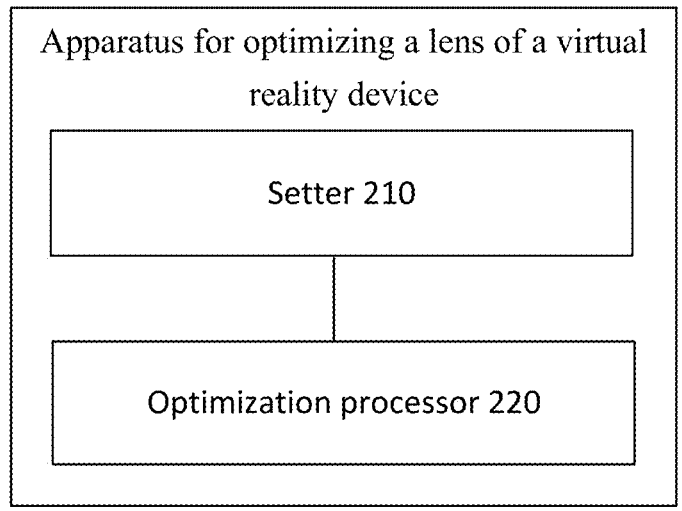
FIG. 17 is a structure diagram of an apparatus for optimizing a lens of a virtual reality device provided by an exemplary embodiment.

As shown in FIG. 17, it is a structure diagram of an apparatus for optimizing a lens of a virtual reality device provided by an embodiment of the disclosure. The apparatus provided by the exemplary embodiment includes: a setter and an optimization processor.

Therein, the setter 210 is used for setting an optimization objective and optimization variables for imaging with a lens.

The apparatus for optimizing a lens of a virtual reality device provided by the embodiment of the disclosure is used for carrying out a scheme of design optimization for a lens of a VR device. The optimization objective and optimization variables set by the setter 210 may be considered based on the perspective of an actual application scenario and user. Design requirements in an actual application for example include the following. Firstly, based on the perspective of a user's use, in order to satisfy the requirements for volume and weight, the VR device in the scheme of the embodiment of the disclosure adopts a one-piece lens; secondly, the exit pupil of the VR device is a human eye, the pupil distance and the exit pupil may be considered, for example, the pupil distance will limit the size and shape of the lens, and the human eye directly sets the exit pupil position and size of the lens in the VR device, for instance, the size of the exit pupil is 2-8 mm, and the exit pupil distance is 10-20 mm; and thirdly, due to the application scenario of the VR device and the user's usage demands, there is a requirement for a large field of view for lens imaging. In addition, the optimization variables may be the above-mentioned pupil distance, the exit pupil distance, the surface pattern and thickness of the lens, and all parameter variables related with computation in the lens optimization process.

The optimization objective of the VR device in the exemplary embodiment is different from the design objective of a traditional optical lens, which is usually one of multiple lenses and a small field of view for the traditional lens. Based on the actual situation in which the design objective of the traditional lens is different and the one-piece lens in the VR device cannot solve various aberration problems, how to design the one-piece lens of the VR device and how to improve the imaging effect of the one-piece lens in the VR device is an objective of optimizing the lens in the exemplary embodiment.

The optimization processor 220 is used for performing optimization processing on the imaging of an object point through the lens by the optimization variables, and obtaining a lens parameter value by which the imaging result is in accordance with the optimization objective, an image surface of the imaging of the object point through the lens being an image surface on which the astigmatism is less than a preset threshold.

In the exemplary embodiment of the disclosure, after the optimization objective and the optimization variables are set by the setter 210 according to the requirements of an actual design, the optimization processor 220 may perform optimization processing on the imaging of an object point through the lens by the optimization variables. The object point in the exemplary embodiment is an exit pupil point based on the pupil of the human eye. In the process of optimizing the imaging of the object point, since the optimization variables are variable, it may be possible to change part or all of the optimization variables by constant adjustment, so as to find optimization variable values by which the imaging result is accordance with the set optimization objective. These optimization variable values include a lens parameter value, and the lens parameter value may be employed later to manufacture the lens, to obtain a VR device whose imaging result meets the optimization objective. The process of adjusting the optimization variables may be a process of computer software processing. For example, computational formulae related with various aberrations in lens imaging are written into a computer program in the form of an objective function, the program is iterated for the objective function by constantly adjusting the objective variables in the objective function, the program stops iteration after the set optimization objective is arrived at after enough iterations, and numerical values of objective parameters which satisfy the optimization objective are obtained. At this point, the obtained numerical values of objective parameters include the lens parameter value.

In the apparatus provided by exemplary embodiments, one of the design requirements is such that an image surface of the imaging of an object point through the lens is an image surface on which the astigmatism is less than a preset threshold, that is, the astigmatism is required to be infinitely close to zero. FIG. 2 illustrates that both the meridional and sagittal image surfaces are curved surfaces symmetrical with respect to the optical axis. Referring to the astigmatism as shown in FIG. 7, when the astigmatism is zero, the meridional image surface coincides with the sagittal image surface, but the curvature of the image surfaces still exists, and at this point, the curved image surface is called a Petzval field curvature image surface (Petzval image surface for short hereinafter). In the embodiment of the disclosure, the image surface of the imaging of the object point is right the Petzval image surface, that is, the apparatus provided by the embodiment of the disclosure optimizes the lens on the Petzval image surface, namely, an image surface on which the astigmatism is infinitely close to zero is directly selected for optimization in the optimization design.

It is noted that, 3D imaging on different image surfaces and the feasibility of optimizing the lens on the Petzval image surface have been described in detail, which demonstrates that optimization of the lens of the VR device on the Petzval image surface does not have an adverse impact on the optical effect of the lens imaging, namely, verifies that the way in which the apparatus provided by the embodiment of the disclosure performs optimization is effective.

In the related VR devices, the weight and volume of the three-piece and two-piece lenses are large, and the form of the two-piece lens is special, processing and shaping the lens is difficult and the difficulty of assembly is high; and although there is a one-piece lens, the difficulty in aberration optimization is high, and it does not solve the problem of design optimization for field curvature, astigmatism, etc., which causes that the imaging quality of the lens is low and it is difficult to meet the user's needs.

In the apparatus for optimizing a lens of a virtual reality device provided by exemplary embodiments, by setting an optimization objective and optimization variables for lens imaging by the setter 210 and performing optimization processing on the imaging of an object point through the lens by the optimization variables by the optimization processor 220, that is, optimizing the imaging result, a lens parameter value by which the imaging result is in accordance with the optimization objective is obtained, wherein an image surface of the imaging of the object point through the lens is an image surface on which the astigmatism is less than a preset threshold (ideally, an image surface when the astigmatism is zero, i.e., Petzval image surface), and the optimization objective, the optimization variables and the image surface of the lens imaging are all designed based on the human eye visual characteristics. Based on the human eye visual characteristics, the apparatus for optimizing a lens of a virtual reality device provided by the exemplary embodiment performs elimination and attenuation processing on the aberrations of the lens imaging in the VR device on the curved image surface of the Petzval field curvature, causing that the lens obtained after the optimization may meet the requirement that various aberrations are as small as possible, which may simplify the difficulty in optimization and guarantee the imaging quality of the lens. More importantly, the method will not bring about an adverse impact on the optical effect of the lens imaging, may give consideration to the advantages of portability and low cost, etc. by employing only one piece of lens.

Figure 18:
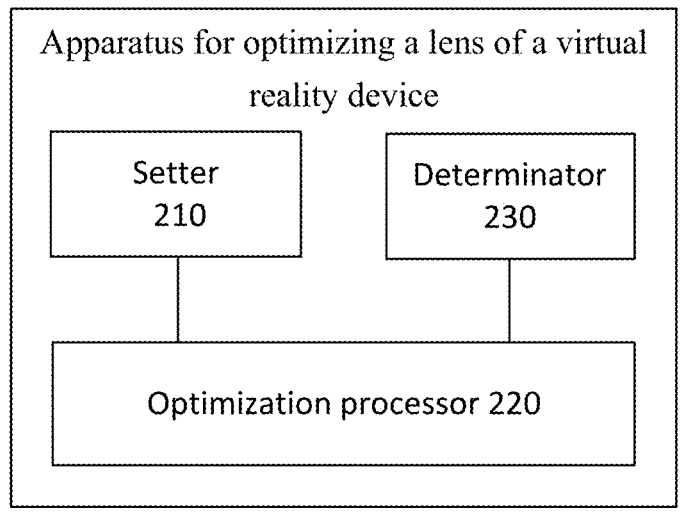
FIG. 18 is a structure diagram of another apparatus for optimizing a lens of a virtual reality device provided by an exemplary embodiment.

FIG. 18 is a structure diagram of another apparatus for optimizing a lens of a virtual reality device provided by an exemplary embodiment. On the basis of the structure of the apparatus as shown in FIG. 17, the apparatus provided by this exemplary embodiment may further include: a determinator 230 for determining multiple fields of view corresponding to an object point to be imaged.

In an exemplary embodiment, an implementation of the optimization processor 220 performing optimization processing on the imaging of an object point through the lens by the optimization variables may include performing optimization processing on the imaging of an object point in each of the fields of view through the lens by the optimization variables, and obtaining a lens parameter value by which the imaging result is in accordance with the optimization objective.

In an exemplary embodiment, multiple fields of view may be set according to an actual situation. The fields of view may be set in one direction from the optical axis, for example, the fields of view determined in a design are 0°, 10°, 20°, 30°, 40°, 45°. In view of the symmetry with respect to the optical axis, a field of view of the VR device in a practical application is twice the designed maximum. After the multiple fields of view are set, an optical design program may be programmed in a computer to trace object points emanating from the set fields of view according to the basic optical principles (for example, including the law of light propagation along a straight line and the law of refraction, etc.) and trace the condition of image points when the object points arrive at the Petzval image surface. Referring to the schematic diagram of the imaging of the object point as shown in FIG. 12, it can be seen that, image points on the Petzval image surfaces which are imaged by object points on parallel light beams are coincident.

In an exemplary embodiment, the process of performing optimization processing by the optimization processor 220 may be a process of computer software processing, and in an implementation of performing optimization processing on the imaging of an object point by a computer program, the optimization processor 220 in an exemplary embodiment may include:

a function generation unit for generating an objective function according to the optimization objective and the optimization variables;

an initial value determination unit for determining initial values of the optimization variables;

a result obtaining unit for obtaining an imaging result of the object point through the lens according to the initial values and the objective function; and an optimization processing unit for adjusting the initial values according to the comparison of the imaging result with the optimization objective, and obtaining the imaging result of the object point through the lens according to the adjusted values of the optimization variables and the objective function, until a lens parameter value is obtained by which the imaging result is accordance with the optimization objective.

In exemplary embodiments, the set optimization objective, optimization variables and the computational approach of various aberrations to be processed may be programmed in a computer in the form of program code, and combined with some optimization algorithms (e.g., least square method, damped least square method, some global optimization algorithms, etc.) to generate an objective function, and subsequently, an imaging result of the object point through the lens is obtained according to the determined initial values and objective function. That is, tracing of the imaging result of the object point is simulated by means of substituting the initial values into the objective function, the imaging result is compared with the set optimization objective, the difference between the aberration of the current lens imaging and the optimization objective may be known from the comparison, the initial values of the optimization variables may be adjusted according to the compared difference, that is, a parameter related with the lens imaging is adjusted, and the imaging result of the object point through the lens is obtained by constantly adjusting the initial values of the optimization variables, until a lens parameter value is obtained by which the imaging result is accordance with the optimization objective, that is, the optimization of the lens is accomplished.

It is noted that, in an approach of determining initial values of the optimization variables, the initial values may be set by the designer based on experience, or may also be generated by the computer program by default, or may further be set according to a parameter of a related better lens, which will not be specifically defined by the exemplary embodiment.

The feasibility of optimizing an aberration of the lens imaging on the Petzval image surface has been elucidated in the above embodiment, and the optimization includes not only optimization of field curvature and astigmatism, but also optimization of aberrations such as distortion, dispersion, spherical aberration and coma, etc. The approach of optimization is equally the steps S100-S120, including the above further steps 1-4, and the variable values which meet the optimization objective are obtained after multiple iterative computations.

It has been described in the above exemplary embodiments that the optimization variables include a variable(s) related with the lens. In an exemplary embodiment, the optimization variables and the lens parameter in the embodiments of the disclosure may include surface patterns of the two surfaces of the lens, the curvature radius and physical radius of each of the surfaces, and the thickness of the lens, and in addition, the optimization variables may further include some variables in the computational process, for example, the surface pattern, curvature radius, physical radius and conic coefficient of the image surface, etc. An example of the optimization variables may be referred to the content in the above table 2, and when the surface pattern of the lens obtained after optimization is an even aspheric surface, the specific computational approach has been described in detail in the above embodiments, which will not be repeated here any longer.

In the above exemplary embodiments, it has been described that the optimization objective in the optimization apparatus provided by the exemplary embodiments is set based on the human eye characteristics. In the following exemplary embodiments, an approach of setting the optimization objective will be described in detail.

In an exemplary embodiment, the optimization objective may include:

a first aspect, a light spot of the imaging of the object point through the lens on the image surface (i.e., Petzval image surface) meeting a first preset condition; and a second aspect, an aberration of the imaging of the object point through the lens meeting a second preset condition.

In the first aspect, for the characteristics of the light spot of the imaging of the object point on the image surface, based on the human eye visual system, the light spots of standard RGB trichromatic light may be considered, and in a practical simulation computation for light spot tracing, the wavelengths of the trichromatic light are 0.486 um, 0.587 um and 0.656 um, respectively.

In an exemplary embodiment, an implementation of a light spot of the object point on the image surface meeting a first preset condition may include one or more of the following:

first, the root-mean-square radius of the red light spot, the green light spot and the blue light spot of the imaging of the object point on the image surface being less than a first radius value; and second, the geometric radius of the red light spot, the green light spot and the blue light spot of the imaging of the object point on the image surface being less than a second radius value.

An implementation of the exemplary embodiment may be referred to the dot matrix diagram of light spots of an object point on an image surface in FIG. 13 and the optimized values in the table 3. The numerical value of the root-mean-square radius in the largest field of view (45°) is 148 um, which is clearly reduced very much as compared with about 400 um in the related lens.

In the second aspect, for optimization of an aberration of the imaging of the object point on the image surface, the aberration to be optimized usually includes field curvature, astigmatism, distortion, dispersion, spherical aberration and coma.

In an implementation of the exemplary embodiments, starting from the concept of an optimized design, optimization objectives which are consistent with the human eye visual characteristics may be set for these aberrations, which for example include one or more of the following:

first, the positions of the meridional field curvature and the sagittal field curvature of the imaging of the object point being close to each other, such that the astigmatism is less than a preset threshold;

second, the distortion and dispersion of the imaging of the object point being less than a preset threshold within a preset field of vision; and third, the spherical aberration and the coma of the imaging of the object point on the image surface being less than a preset threshold.

In the above, optimizing the imaging of the object point through the lens on the Petzval image surface by the exemplary embodiments has been described. That is, setting the astigmatism to zero in the optimization conditions is an ideal situation, multiple aberrations are usually taken into account in the optimization design, and therefore, the astigmatism is controlled as much as possible to be infinitely close to zero, that is, the meridional field curvature and the sagittal field curvature are controlled to be as close to each other as possible; in view of the limit of the human eye resolution, the distortion and the dispersion may be controlled to be as small as possible in a field of vision of 30°; and in addition, the two aberrations of spherical aberration and coma are controlled to be as small as possible on the curved image surface (i.e., Petzval image surface). On the basis of the human eye visual characteristics and in combination with the characteristic of software preprocessing which may be adopted in the lens optimization, the above optimization objectives can achieve a lens design with a high image quality under the condition of a one-piece lens, and simplify the design process of a lens in a VR device.

In an exemplary embodiment, in another implementation of the embodiments of the disclosure, that an aberration meets a second preset condition may include: a weighted value of the field curvature, astigmatism, distortion, dispersion, spherical aberration and coma of the imaging of the object point through the lens being less than a preset aberration threshold.

In the exemplary embodiment, starting from a computed value of the aberrations of the imaging of the object point being a design objective, it is required that the value of each term in the aberrations is as small as possible, that is, the weighted value of all the aberration values is as small as possible (the effect of the value of each term in the aberrations on the vision corresponds to a respective weighting coefficient), namely, the resulting aberration values are as small as possible.

The apparatus for optimizing a lens of a virtual reality device provided by the embodiments of the disclosure may reduce the value of each term in the aberrations as much as possible. With reference to the results of aberration optimization as shown in FIG. 14 and FIG. 15, the numerical values of the meridional field curvature and the sagittal field curvature in FIG. 14 are very close to each other, and less than 2 um, and this value of astigmatism is less than that of a two-piece lens in a related VR device; and in FIG. 15, the value of distortion is less than 40% in the field of view of 45°, and thus the loss of resolution may satisfy the needs of the human eye perspective.

The apparatus for optimizing a lens of a virtual reality device provided by the exemplary embodiments sets the optimization objective and the optimization variables based on the human eye visual characteristics, and optimizes an aberration of the imaging of the object point on the Petzval image surface, wherein the software preprocessing capabilities of the VR device are combined in the process of optimization processing, which can better ascertain, simplify and optimize the design approach of the lens in the VR device, and obtain the lens with a high image quality.

An exemplary embodiment further provides an apparatus for optimizing a lens of a virtual reality device including: a processing system; a memory storing thereon computer executable instructions which, when executed in the processing system, enable a method as described in any of the above method embodiments.

An exemplary embodiment further provides a computer readable storage medium storing thereon computer executable instructions which, when executed by a computing device, cause the computing device to implement a method as described in any of the above exemplary embodiments.

Figure 19:
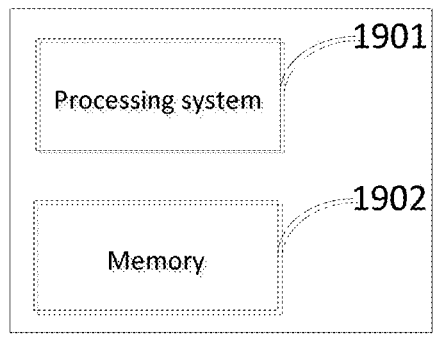
FIG. 19 is a hardware structure diagram of an apparatus performing methods for optimizing a lens of a virtual reality device according to exemplary embodiments.

With reference to FIG. 19, it is a hardware structure diagram of an apparatus performing methods for optimizing a lens of a virtual reality device according to exemplary embodiments. The device includes at least one processing system 1901 and a memory 1902. In FIG. 19, one processing system 1901 is taken as an example.

The apparatus performing methods for optimizing a lens of a virtual reality device may further include other elements for different purposes. The processing system 1901 and the memory 1902 may be connected via bus or other means.

As a non-volatile computer readable storage medium, the memory 1902 may be used for storing a non-volatile software program, a non-volatile computer executable program and module, for example, a program instruction/module corresponding to the methods for optimizing a lens of a virtual reality device in the exemplary embodiments. The processing system 1901 performs various functional applications and data processing by running the non-volatile software program, instruction and module stored in the memory 1902, namely, implements the methods for optimizing a lens of a virtual reality device of the above exemplary embodiments.

The memory 1902 may include a storage program area and a storage data area, wherein the storage program area may store an operating system, an application program required for at least one function, and the storage data area may store data created according to the use of the assisted driving apparatus, etc. In addition, the memory 1902 may include a high-speed random access memory, or also may include a non-volatile storage, for example, at least one disk storage device, flash device or other non-volatile solid storage devices. In some exemplary embodiments, the memory 1902 includes a storage arranged remotely relative to the processing system 1901, which may be connected to the assisted driving apparatus via a network. Examples of the network include, but not limited to, the internet, intranet, local area network, mobile communication network and a combination thereof.

The apparatuses of FIGS. 17 and 18, including the setter 210, determinator 230 and optimization processor 220 may be stored in the memory 1902, and when executed by the one or more processing system 1901, performs the methods for optimizing a lens of a virtual reality device in any of the method embodiments.

An embodiment of the disclosure further provides a computer program including computer executable instructions which, when executed by a computing device, cause the computing device to implement a method as described in any of the above exemplary embodiments.

The exemplary embodiments disclosed by the disclosure are just embodiments employed for the convenience of understanding the disclosure, and is not used to limit the disclosure. Any person having skills in the art the disclosure belongs to may make any modifications and changes to the embodied forms and details without departing from the spirit disclosed by the disclosure and the scope of the disclosure. However, the patent protection scope of the disclosure should still be subject to the scope defined by the appended claims.

The invention claimed is:

1. A method for optimizing a lens of a virtual reality device comprising:
   setting an optimization objective and optimization variables for imaging with a lens; and
   performing optimization processing on the imaging of an object point through the lens by the optimization variables, and obtaining a lens parameter value only by which the imaging result is in accordance with the optimization objective, an image surface of the imaging of the object point through the lens being an image surface on which the astigmatism is less than a preset threshold,
   wherein the aberration comprises all of: field curvature, astigmatism, distortion, dispersion, spherical aberration and coma,
   wherein the optimization objective comprises:
   the aberration of the imaging of the object point through the lens meeting a first preset condition, comprising all of:
      the positions of meridional field curvature and sagittal field curvature of the imaging of the object point being close to each other, such that the astigmatism is less than a preset threshold,
      the distortion and dispersion of the imaging of the object point being less than a preset threshold within a preset field of vision, and
      the spherical aberration and the coma of the imaging of the object point on the image surface being less than a preset threshold,
   or,
   the aberration of the imaging of the object point through the lens meeting the first preset condition comprising:
      a weighted value of the field curvature, astigmatism, distortion, dispersion, spherical aberration and coma of the imaging of the object point through the lens being less than a preset aberration threshold,
   wherein light of the object point comprises red light, green light and blue light, and the optimization objective further comprises one or more of the following:
      the root-mean-square radius of the red light spot, the green light spot and the blue light spot of the imaging of the object point on the image surface being no larger than 148.320 μm which is the root-mean-square radius at the maximum field of view of 45°; and
      the geometric radius of the red light spot, the green light spot and the blue light spot of the imaging of the object point on the image surface being no larger than 302.664 μm which is the geometric radius at the maximum field of view of 45°.

2. The method of claim 1, wherein before the setting an optimization objective and optimization variables for imaging with a lens, the method further comprises:
   determining multiple fields of view corresponding to an object point to be imaged; and
   the performing optimization processing on the imaging of an object point through the lens by the optimization variables comprises:
   performing optimization processing on the imaging of an object point in each of the fields of view through the lens by the optimization variables.

3. The method of claim 1, wherein the performing optimization processing on the imaging of an object point through the lens by the optimization variables comprises:
   generating an objective function according to the optimization objective and the optimization variables;
   determining initial values of the optimization variables;
   obtaining an imaging result of the object point through the lens according to the initial values of the optimization variables and the objective function; and
   adjusting the initial values of the optimization variables according to the comparison of the imaging result with the optimization objective, and obtaining the imaging result of the object point through the lens according to the adjusted initial values of the optimization variables and the objective function, until a lens parameter value is obtained by which the imaging result is accordance with the optimization objective.

4. The method of claim 1, wherein the optimization variables and the lens parameter include surface patterns of the two surfaces of the lens, the curvature radius and physical radius of each of the surfaces, and the thickness of the lens; and
   the optimization variables further include the surface pattern, curvature radius, physical radius and conic coefficient of the image surface.

5. An apparatus for optimizing a lens of a virtual reality device comprising:
   a processing system;
   a memory storing thereon computer executable instructions which, when executed in the processing system, enable a method as claimed in claim 1.

6. A computer readable storage medium storing thereon computer executable instructions which, when executed by a computing device, cause the computing device to implement a method as claimed in claim 1.

7. A computer program produce comprising computer executable instructions which, when executed by a computing device, cause the computing device to implement a method as claimed in claim 1.

8. An apparatus for optimizing a lens of a virtual reality device comprising:
   a setter for setting an optimization objective and optimization variables for imaging with a lens; and an optimization processor for performing optimization processing on the imaging of an object point through the lens by the optimization variables, and obtaining a lens parameter value by which the imaging result is in accordance with the optimization objective, an image surface of the imaging of the object point through the lens being an image surface on which the astigmatism is less than a preset threshold, wherein the aberration comprises all of: field curvature, astigmatism, distortion, dispersion, spherical aberration and coma, wherein the optimization objective comprises:

the aberration of the imaging of the object point through the lens meeting a first preset condition, comprising all of:
  the positions of meridional field curvature and sagittal field curvature of the imaging of the object point being close to each other, such that the astigmatism is less than a preset threshold,
  the distortion and dispersion of the imaging of the object point being less than a preset threshold within a preset field of vision, and
  the spherical aberration and the coma of the imaging of the object point on the image surface being less than a preset threshold, or, the aberration of the imaging of the object point through the lens meeting the first preset condition comprising:
  a weighted value of the field curvature, astigmatism, distortion, dispersion, spherical aberration and coma of the imaging of the object point through the lens being less than a preset aberration threshold, wherein light of the object point comprises red light, green light and blue light, and the optimization objective further comprises one or more of the following:

the root-mean-square radius of the red light spot, the green light spot and the blue light spot of the imaging of the object point on the image surface being no larger than 148.320 µm which is the root-mean-square radius at the maximum field of view of 45°; and the geometric radius of the red light spot, the green light spot and the blue light spot of the imaging of the object point on the image surface being no larger than 302.664 µm which is the geometric radius at the maximum field of view of 45°.

9. The apparatus of claim 8, further comprising:
a determinator for determining multiple fields of view corresponding to an object point to be imaged; and
the optimization processor performing optimization processing on the imaging of an object point through the lens by the optimization variables comprises:
performing optimization processing on the imaging of an object point in each of the fields of view through the lens by the optimization variables.

10. The apparatus of claim 8, wherein the optimization processor comprises:
a function generation unit for generating an objective function according to the optimization objective and the optimization variables;
an initial value determination unit for determining initial values of the optimization variables;
a result obtaining unit for obtaining an imaging result of the object point through the lens according to the initial values of the optimization variables and the objective function; and
an optimization processing unit for adjusting the initial values of the optimization variables according to the comparison of the imaging result with the optimization objective, and obtaining the imaging result of the object point through the lens according to the adjusted initial values of the optimization variables and the objective function, until a lens parameter value is obtained by which the imaging result is accordance with the optimization objective.

11. The apparatus of claim 8, wherein the optimization variables and the lens parameter include surface patterns of the two surfaces of the lens, the curvature radius and physical radius of each of the surfaces, and the thickness of the lens; and
the optimization variables further include the surface pattern, curvature radius, physical radius and conic coefficient of the image surface.

* * * * *